No. 615,005. Patented Nov. 29, 1898.
F. W. WALQUIST.
SAW.
(Application filed Nov. 12, 1896.)
(No Model.)
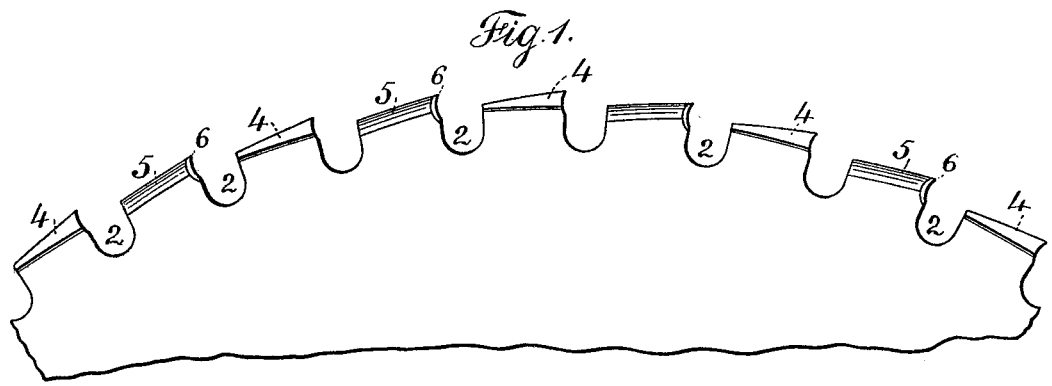
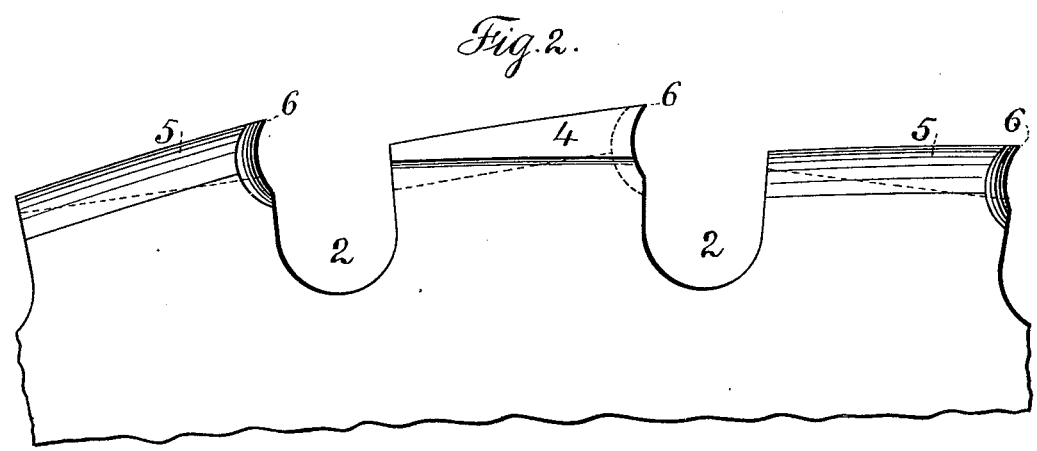
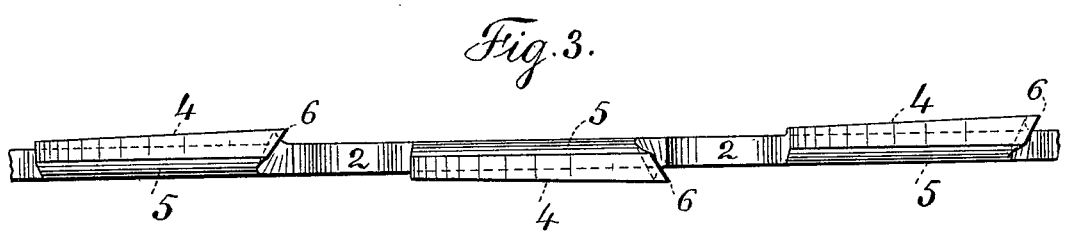
Witnesses:
J. Staib
Chas H Smith
Inventor:
Frank W. Walquist
per L. W. Serrell & Son
Attys

UNITED STATES PATENT OFFICE.

FRANK W. WALQUIST, OF NEW YORK, N. Y., ASSIGNOR TO JOHN G. MOORE, OF SAME PLACE.

SAW.

SPECIFICATION forming part of Letters Patent No. 615,005, dated November 29, 1898.

Application filed November 12, 1896. Serial No. 611,806. (No model.)

*To all whom it may concern:*

Be it known that I, FRANK W. WALQUIST, a citizen of the United States, residing at New York, (Brooklyn,) in the county of Kings and State of New York, have invented an Improvement in Saws, of which the following is a specification.

Saws have heretofore been made with flat ribs projecting slightly at the sides of the teeth and with the circumferential edges of the teeth at a backward inclination, and the ribs have in some instances projected laterally to a greater extent closely adjacent to the cutting end of the tooth than at the rear end of such tooth.

The present invention is made with reference to producing a crosscut-saw that is easily sharpened and does not rapidly become dull in consequence of the cutting-point of each tooth being concave and at an acute angle to the side of the saw, so that the point of the tooth acts as a hook in passing into the wood, and at the same time the acute angle at the side of the tooth forms a sharp cutter that severs the fibers of the wood, and the teeth alternating cut the kerf clean at both sides, and in practice this saw is found to require much less power in driving and leaves the surface of the wood much smoother than those saws which have heretofore been made with flat projecting ribs at the sides of the teeth and with straight instead of concave acute-angle cutting edges at the forward ends of the teeth.

In the drawings, Figure 1 is a side view showing a portion of a circular saw. Fig. 2 represents adjacent teeth in a magnified size, and Fig. 3 is an edge view of Fig. 2.

The saw may be of any desired size, and each tooth is to be of a length adapted to obtaining the necessary strength, and the throats or recesses 2 between the respective teeth are to be of sufficient size for receiving the sawdust. Each tooth has a flat rib 4 projecting at one side, and to lessen the risk of heating by friction upon the wood the front end of the rib is to project more from the plane of the side of the saw than the rear end of such rib, as shown in Fig. 3, and it is advantageous to bevel the opposite side of each tooth at an obtuse angle to the surface of the saw, as shown at 5.

The saw is advantageously sharpened by a circular milling-tool adapted to be held at an inclination to the plane of the saw and rotated by hand, so that the front of each tooth is formed as a segmental recess, and the point 6 of the tooth is curved or hook-shaped, and the mill or sharpening-tool being at an inclination to the plane of the saw produces an acute-angled cutting edge at the end of the rib 4.

In consequence of this mode of making the teeth as they stand in opposite directions, so as to cut a sufficiently wide kerf to prevent friction upon the saw, each tooth makes a clean cut in the angle of the kerf, and the hook shape causes the tooth to penetrate into the wood with but little pressure, and the acute angle forms a cutter that retains its sharpness, and the undercut curvature immediately adjacent to the point of the tooth causes the tooth to act with a shearing cut in transversely severing the fibers of the wood as the tooth penetrates such wood, and in practice this saw is found to sever the wood transversely or cross-grain, leaving the end grain of the wood sufficiently smooth for ordinary purposes instead of the fiber being drawn out and broken, as very frequently is the case in circular saws that are made without fleam or scoring teeth between the chisel-shaped teeth. The acute angles of the teeth and their curved cutting edges tend to spring the points of the teeth outward while cutting, and hence the friction of the teeth on the wood is lessened both in ripping as well as in cross-cutting. In sharpening the teeth with a circular milling-tool at the acute angle the tendency is to bend the metal outward, giving a set to the cutting edge, and thereby insuring freedom in the cutting operation and causing the teeth to remain sharp a greater length of time than those that are sharpened at right angles to the side of the blade.

In consequence of all the teeth in the saw being substantially alike each one has to be sharpened in the same manner; but of course it is necessary that the angle at which the rotary milling or sharpening tool is held shall be varied, the alternate teeth being sharpened by the mill set at one angle, and then the intermediate teeth are sharpened by the mill set at the opposite angle.

I claim as my invention—

1. A saw-tooth having a flat rib projecting beyond the side of the saw, a beveled outer or peripheral edge to the tooth and a concave front end to the tooth at an acute angle to the side of the saw to form a hook-shaped point and acute cutting edge, substantially as set forth.

2. A saw-tooth having a flat rib projecting beyond the side of the saw, a beveled outer or peripheral edge to the tooth, and a concave front end to the tooth at an acute angle to the side of the saw to form a hook-shaped point and acute cutting edge, the opposite side of the tooth to the flattened rib being beveled or inclined, substantially as set forth.

3. A crosscut-saw having teeth standing in opposite directions, each tooth having a flat rib projecting beyond the side of the saw, a beveled outer or peripheral edge to the tooth and a concave front end to the tooth at an acute angle to the side of the saw to form a hook-shaped point and acute cutting edge, substantially as set forth.

Signed by me this 2d day of November, 1896.

FRANK W. WALQUIST.

Witnesses:
   GEO. T. PINCKNEY,
   S. T. HAVILAND.